(12) United States Patent
Futenma et al.

(10) Patent No.: US 7,266,610 B2
(45) Date of Patent: Sep. 4, 2007

(54) PICTURE DISTRIBUTION SYSTEM AND METHOD, PICTURE DISTRIBUTION APPARATUS AND A METHOD THEREFOR, PICTURE RECEIVING APPARATUS AND A METHOD THEREFORE, AND RECORDING MEDIUM AND PROGRAM USED THEREWITH

(75) Inventors: Satoshi Futenma, Tokyo (JP);
Eisaburo Itakura, Kanagawa (JP);
Takahiro Fukuhara, Kanagawa (JP);
Yasuhiko Ichino, Tokyo (JP)

(73) Assignee: Sony Corporation, Tokyo (JP)

( * ) Notice: Subject to any disclaimer, the term of this patent is extended or adjusted under 35 U.S.C. 154(b) by 878 days.

(21) Appl. No.: 10/313,187

(22) Filed: Dec. 6, 2002

(65) Prior Publication Data

US 2003/0120794 A1    Jun. 26, 2003

(30) Foreign Application Priority Data

Dec. 11, 2001    (JP)    ............................ P2001-377667

(51) Int. Cl.
*G06F 15/16*    (2006.01)
(52) U.S. Cl. ................... 709/231; 348/699; 725/87
(58) Field of Classification Search ............... 709/231, 709/219, 217; 348/207.99, 699; 725/87; 375/240.16
See application file for complete search history.

(56) References Cited

U.S. PATENT DOCUMENTS 6,144,701 A * 11/2000 Chiang et al. .............. 375/240
6,263,100 B1 * 7/2001 Oshino et al. .............. 382/154
6,583,808 B2 * 6/2003 Boulanger et al. ....... 348/14.09
6,980,254 B1 * 12/2005 Nishihashi et al. ......... 348/452
7,015,951 B1 * 3/2006 Yoshigahara et al. .. 348/207.99
2003/0172131 A1 * 9/2003 Ao ............................. 709/219

FOREIGN PATENT DOCUMENTS

| JP | 6-141211 | 5/1994 |
|---|---|---|
| JP | 7-59000 | 3/1995 |
| JP | 9-261552 | 10/1997 |
| JP | 10-224772 | 8/1998 |
| JP | 11-205772 | 7/1999 |
| JP | 2000-132674 A | 5/2000 |
| JP | 2001-8232 | 1/2001 |

* cited by examiner

*Primary Examiner*—Abdullahi Salad
(74) *Attorney, Agent, or Firm*—Bell, Boyd & Lloyd LLP

(57) ABSTRACT

A picture transmitting apparatus transmits, to a picture receiving apparatus, a picture as a predetermined area of an omnidirectional picture. The picture receiving apparatus displays a portion of the transmitted picture which corresponds to a viewpoint. When the viewpoint is moved, information of the movement is transmitted from the picture receiving apparatus to the picture transmitting apparatus, and a picture corresponding to the new viewpoint is transmitted from the picture transmitting apparatus to the picture receiving apparatus. The picture receiving apparatus displays a portion of the received picture which corresponds to the viewpoint.

12 Claims, 13 Drawing Sheets

PICTURE DISTRIBUTION SYSTEM AND METHOD, PICTURE DISTRIBUTION APPARATUS AND A METHOD THEREFOR, PICTURE RECEIVING APPARATUS AND A METHOD THEREFORE, AND RECORDING MEDIUM AND PROGRAM USED THEREWITH

BACKGROUND OF THE INVENTION

The present invention relates to picture distribution systems and methods, picture distributing apparatuses and methods therefor, picture receiving apparatuses and methods therefor, and recording media and programs used therewith, and in particular, to a picture distribution system and method, a picture distribution apparatus and a method therefor, and a picture receiving apparatus and a method therefore in which pictures can be distributed without overloading a network, and a recording medium and a program which are used therewith.

A new picture-space service is in the process of being launched. In the new picture-space service, from pictures having various viewpoints, such as omnidirectional pictures, a user can selectively view a picture from a user-preferred viewpoint. Multi-viewpoint pictures such as omnidirectional pictures have large amounts of data since they include pictures constituting the space, other than a picture (or a displayed picture) being actually viewed by the user.

When the streaming distribution of the multi-viewpoint pictures is performed by a transmission link such as the Internet, in the existing streaming distribution systems, such as REALSERVER® of RealVideo and QUICKTIME® of Apple, all pictures constituting the picture space are distributed from a server to a client. This is because an application such as transmission of omnidirectional pictures is not assumed.

Japanese Unexamined Patent Application Publication No. 11-205772 describes the network distribution of omnidirectional pictures. In the invention in this Publication, the transmitting side transmits all pictures, while the receiving side separates a picture to be displayed. In this type of distribution method, there is a large load on network bands since all the pictures are distributed despite that most of the pictures are not displayed. Also, when the displayed pictures have compressed form, decoding size increases, thus increasing the processing load on the client. This causes a problem in that real-time processing is difficult.

Accordingly, an approach is required in which only the necessary pictures are distributed without distributing all the pictures. In Japanese Unexamined Patent Application Publication No. 2000-132674, a system is proposed in which a viewpoint picture of omnidirectional pictures is transmitted and received. In the proposed system, a client uses coordinates to designate a viewpoint picture, and a server transmits only a picture at the designated coordinates. The proposed system is based on the assumption that it is mainly used for still pictures. Thus, in response to a user's urgent viewpoint-moving request, a picture from the requested viewpoint cannot be provided due to a delay in response on the network, so that a smooth viewpoint movement is not realized.

SUMMARY OF THE INVENTION

The present invention is made in view of the above circumstances, and an object thereof is to distribute pictures in which a viewpoint can be smoothly moved, without overloading a network and a receiving side.

According to an aspect of the present invention, a picture distribution system is provided which includes a transmitting apparatus, and a receiving apparatus. The transmitting apparatus distributes an omnidirectional picture to the receiving apparatus by a network. The transmitting apparatus includes a first receiving unit for receiving viewpoint information from the receiving apparatus, an extracting unit for, based on the received viewpoint information, extracting a predetermined area as a first picture from the omnidirectional picture, and a first transmitting unit for transmitting, to the receiving apparatus, unit regions obtained by dividing the first picture. The receiving apparatus includes an acquiring unit for acquiring the viewpoint information, a second transmitting unit for transmitting the acquired viewpoint information to the transmitting apparatus, a second receiving unit for receiving the first picture transmitted from the second transmitting apparatus, a storage unit for storing the first picture received by the second receiving unit, and an output unit for outputting a second picture as a predetermined area extracted from the stored first picture, the second picture corresponding to the acquired viewpoint information.

According to another aspect of the present invention, a picture distribution method for distributing an omnidirectional picture from a transmitting apparatus to a receiving apparatus by a network is provided. The transmitting apparatus performs a first receiving step for receiving viewpoint information from the receiving apparatus, an extracting step for, based on the received viewpoint information, extracting a predetermined area as a first picture from the omnidirectional picture, and a first transmitting step for transmitting, to the receiving apparatus, unit regions obtained by dividing the first picture. The receiving apparatus performs an acquiring step for acquiring the viewpoint information, a second transmitting step for transmitting the acquired viewpoint information to the transmitting apparatus, a second receiving step for receiving the first picture transmitted from the transmitting apparatus, a storage step for storing the first picture received in the second receiving step, and an output step for outputting a second picture as a predetermined area extracted from the stored first picture, the second picture corresponding to the acquired viewpoint information.

According to another aspect of the present invention, a picture distribution apparatus for distributing an omnidirectional picture to a receiving apparatus by a network is provided. The picture distributing apparatus includes a receiving unit for receiving viewpoint information from the receiving apparatus, an extracting unit for, based on the received viewpoint information, extracting a predetermined area as a picture from the omnidirectional picture, and a transmitting unit for transmitting, to the receiving apparatus, predetermined unit regions obtained by dividing the picture. Preferably, based on a motion vector included in the received viewpoint and a round trip time of the network, the extracting unit determines the next predetermined area to be extracted from the omnidirectional picture.

The picture distribution apparatus may further include a calculating unit for calculating the margin of a predetermined area which is output by the receiving apparatus in response to the viewpoint information, and which corresponds to the predetermined area transmitted to the receiving apparatus by the transmitting unit. Based on the received viewpoint information and the calculated margin, the extracting unit may extract the predetermined area as the picture from the omnidirectional picture.

According to another aspect of the present invention, a picture distribution method for a picture distribution apparatus for distributing an omnidirectional picture to a receiving apparatus by a network is provided. The picture distribution method includes the steps of receiving viewpoint information from the receiving apparatus, extracting, based on the received viewpoint information, a predetermined area as a picture from the omnidirectional picture, and transmitting, to the receiving apparatus, predetermined unit regions obtained by dividing the picture.

According to another aspect of the present invention, a first recording medium containing a computer-readable program for a picture distribution apparatus for distributing an omnidirectional picture to a receiving apparatus is provided. The program includes the steps of receiving viewpoint information from the receiving apparatus, extracting, based on the received viewpoint information, a predetermined area as a picture from the omnidirectional picture, and transmitting, to the receiving apparatus, predetermined unit regions obtained by dividing the picture.

According to another aspect of the present invention, a first program for a computer controlling a picture distribution apparatus for distributing an omnidirectional picture by a network is provided. The program causes the computer to execute the steps of receiving viewpoint information from the receiving apparatus, extracting, based on the received viewpoint information, a predetermined area as a picture from the omnidirectional picture, and transmitting, to the receiving apparatus, predetermined unit regions obtained by dividing the picture.

According to another aspect of the present invention, a picture receiving apparatus for receiving an omnidirectional picture distributed from a transmitting apparatus by a network is provided. The picture receiving apparatus includes an acquiring unit for acquiring viewpoint information, a transmitting unit for transmitting the acquired viewpoint information to the transmitting apparatus, a receiving unit for receiving a first picture as a predetermined area extracted from the omnidirectional picture, the first picture being transmitted from the transmitting apparatus, a storage unit for storing the-received first picture, and an output unit for outputting a second picture as a predetermined area extracted from the stored first picture, the second picture corresponding to the acquired viewpoint information.

The picture receiving apparatus further includes a calculating unit for calculating the margin of the second picture which corresponds to the first picture. Based on the calculated margin, the transmitting unit may transmit the viewpoint information to the transmitting apparatus.

According to another aspect of the present invention, a picture receiving method for a picture receiving apparatus for receiving an omnidirectional picture distributed from a transmitting apparatus by a network is provided. The picture receiving method includes the steps of acquiring viewpoint information, transmitting the acquired viewpoint information to the transmitting apparatus, receiving a first picture as a predetermined area extracted from the omnidirectional picture, the first picture being transmitted from the transmitting apparatus, storing the received first picture, and outputting a second picture as a predetermined area extracted from the stored first picture, the second picture corresponding to the acquired viewpoint information.

According to another aspect of the present invention, a second recording medium containing a computer-readable program for a picture receiving apparatus for receiving an omnidirectional picture distributed from a transmitting apparatus by a network is provided. The program includes the steps of acquiring viewpoint information, transmitting the acquired viewpoint information to the transmitting apparatus, receiving a first picture as a predetermined area extracted from the omnidirectional picture, the first picture being transmitted from the transmitting apparatus, storing the received first picture, and outputting a second picture as a predetermined area extracted from the stored first picture, the second picture corresponding to the acquired viewpoint information.

According to another aspect of the present invention, a second program for a computer controlling a picture receiving apparatus for receiving an omnidirectional picture distributed from a transmitting apparatus by a network is provided. The program causes the computer to execute the steps of acquiring viewpoint information, transmitting the acquired viewpoint information to the transmitting apparatus, receiving a first picture as a predetermined area extracted from the omnidirectional picture, the first picture being transmitted from the transmitting apparatus, storing the received first picture, and outputting a second picture as a predetermined area extracted from the stored first picture, the second picture corresponding to the acquired viewpoint information.

According to a picture distribution system and method of the present invention, viewpoint information is transmitted from a receiving apparatus to a transmitting apparatus, and based on the viewpoint information, a predetermined area is extracted as a first picture from an omnidirectional picture. The first picture is divided into unit regions and is transmitted from the transmitting apparatus to the receiving apparatus.

According to a picture distribution apparatus and method, and a recording medium and a program which are used therewith, based on viewpoint information received from a receiving apparatus, a predetermined area is extracted as a picture from an omnidirectional picture. The picture is divided into predetermined unit regions, and the regions are transmitted to the receiving apparatus.

According to a picture receiving apparatus and method, and a recording medium and a program which are used therewith, viewpoint information is transmitted to a transmitting apparatus, and based on the viewpoint information, a first picture transmitted from the transmitting apparatus is stored, and a predetermined area is extracted as the stored first picture and is output.

Additional features and advantages of the present invention are described in, and will be apparent from, the following Detailed Description of the Invention and the Figures.

DETAILED DESCRIPTION OF THE INVENTION

In the present invention, a distribution method is employed in which, when omnidirectional pictures are distributed through a network, by transmitting a picture corresponding to a viewpoint selected by a user, and the periphery, a response can be made to an urgent viewpoint-moving request from the user. The present invention is specifically described below with reference to the accompanying drawings.

At first, the configuration and operation of the entire system of the present invention are described with reference to FIGS. 1 to 4. After that, more detailed points are explained with reference to FIGS. 5 to 17.

Figure 1:
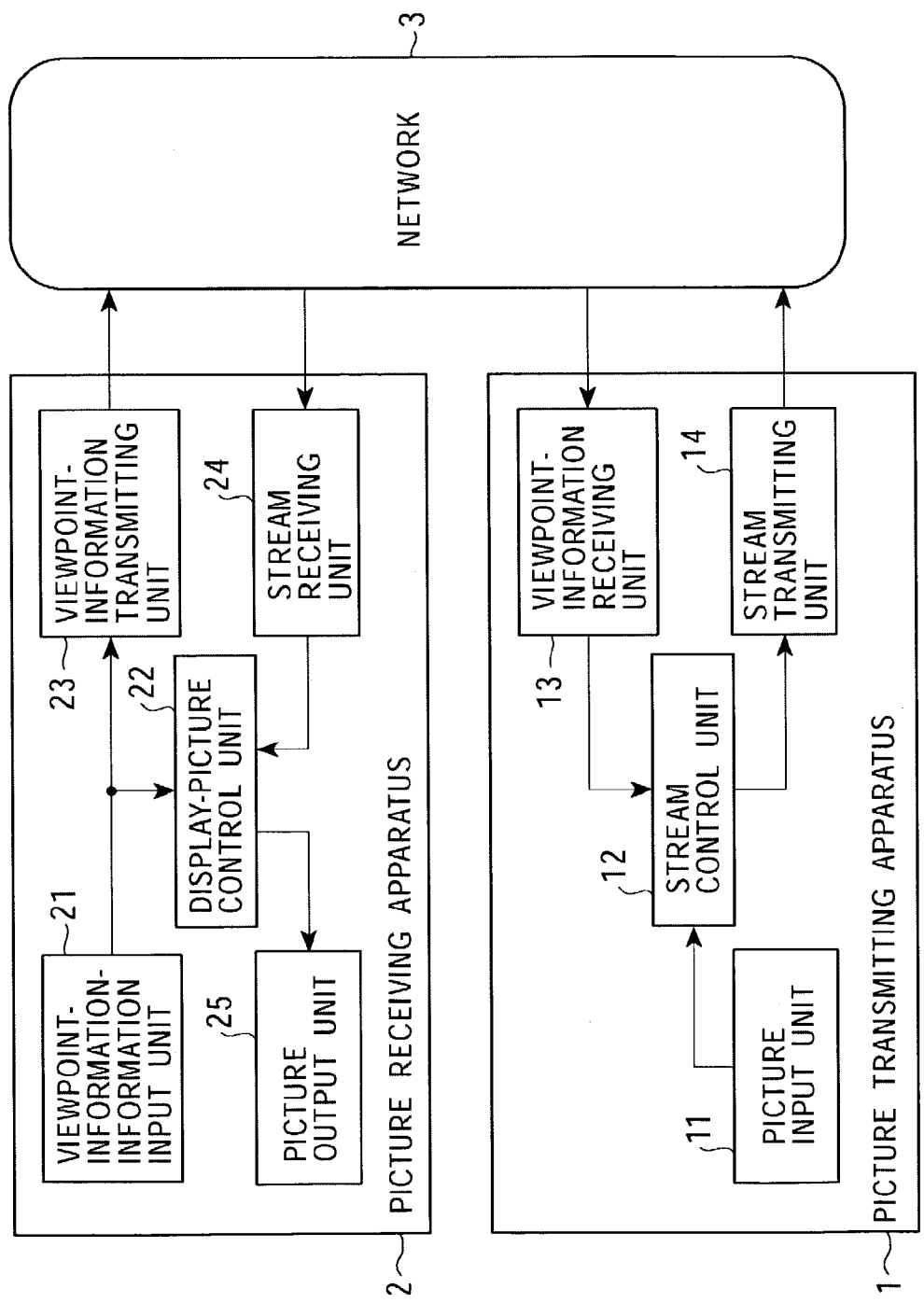
FIG. 1 is a block diagram showing an omnidirectional picture distribution system to which the present invention is applied.

FIG. 1 is a block diagram showing an omnidirectional picture distribution system to which the present invention is applied. The omnidirectional picture distribution system includes a picture transmitting apparatus 1 which generates a multi-viewpoint picture stream such as omnidirectional pictures, and at least a picture receiving apparatus 2 which receives the picture stream from the picture transmitting apparatus 1. The picture transmitting apparatus 1 and the picture receiving apparatus 2 are connected to each other by a network 3 including the Internet, a local area network (LAN), a wide area network (WAN), etc.

The picture transmitting apparatus 1 includes a picture input unit 11, a stream control unit 12, a viewpoint-information receiving unit 13, and a stream transmitting unit 14. A plurality of picture receiving apparatuses 2 are connected to the picture transmitting apparatus 1 by the network 3.

The picture input unit 11 includes, for example, a video-camera, and a disk device storing picture files. A picture input from the picture input unit 11 is transferred to the stream control unit 12. The picture transferred to the stream control unit 12 may be a compression-coded picture stream.

The viewpoint-information receiving unit 13 receives viewpoint information from the picture receiving apparatus 2, and includes a network interface. The viewpoint information from the viewpoint-information receiving unit 13 and the picture stream from the picture input unit 11 are input to the stream control unit 12, and it generates a stream suitable for a viewpoint picture for the picture receiving apparatus 2.

The picture stream output from the stream control unit 12 may be a plurality of streams generated by spatially diving a picture into a plurality of blocks. A method for the division into blocks is, for example, tile division in JPEG (Joint Photographic Experts Group) 2000. The details are described later with reference to FIG. 5.

The stream transmitting unit 14 uses the Real-time Transport Protocol (RTP) or the like to convert the picture stream into packets, and transmits the packets to the picture receiving apparatus 2. The stream transmitting unit 14 also includes a network interface.

The picture receiving apparatus 2 includes a viewpoint-information input unit 21, a display-picture control unit 22, a viewpoint-information transmitting unit 23, a stream receiving unit 24, and a picture output unit 25. The viewpoint-information input unit 21 has, for example, input devices such as a mouse, a keyboard, a head tracker, and a joystick. Viewpoint information input from the viewpoint-information input unit 21 is transferred to the display-picture control unit 22 and the viewpoint-information transmitting unit 23.

The viewpoint-information transmitting unit 23 transmits the viewpoint information to the picture transmitting apparatus 1, and includes a network interface. The stream receiving unit 24 includes a network interface transfers a received picture stream to the display-picture control unit 22. Based on the viewpoint information, the display-picture control unit 22 generates a picture to be displayed from the received picture stream. The display-picture control unit 22 also performs synchronizing processing for the case of receiving a plurality of picture streams. The picture output unit 25 also includes, for example, a display device or the like, and outputs and displays the picture generated by the display-picture control unit 22.

Figure 2:
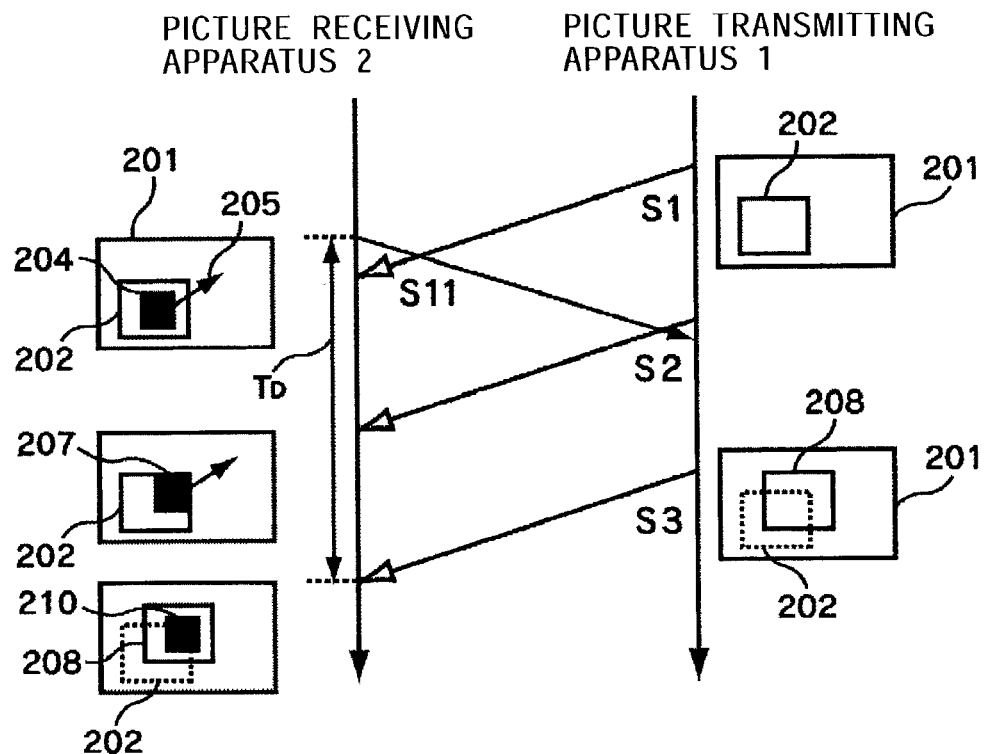
FIG. 2 is an illustration of an operation of the omnidirectional picture distribution system shown in FIG. 1 when a viewpoint is changed.

FIG. 2 shows the communication between the picture receiving apparatus 2 and the picture transmitting apparatus 1 when, in the system of FIG. 1, the viewpoint in the picture receiving apparatus 2 changes. Based on the viewpoint information received from the picture receiving apparatus 2 through the network 3 and the viewpoint-information receiving unit 13, the stream control unit 12 in the picture transmitting apparatus 1 extracts, from the picture input unit 11, a transmitting picture 202 which is a predetermined area (part) of the entire spatial picture 201 among multi-viewpoint pictures such as omnidirectional pictures. In steps S1, S2, etc., the stream transmitting unit 14 transmits the extracted picture 202 to the picture receiving apparatus 2 through the network 3.

In the picture receiving apparatus 2, the display-picture control unit 22 temporarily stores in a built-in storage portion the picture 202 received through the stream receiving unit 24. The display-picture control unit 22 captures, from the viewpoint-information input unit 21, information (viewpoint information) relating to a viewpoint (coordinates) based on a user's operation, and re-generates, from the stored picture 202, a display picture in the area corresponding to the viewpoint. The display-picture control unit 22 outputs and displays the re-generated picture as a user's-viewpoint picture 204 on the picture output unit 25.

When, in the picture receiving apparatus 2, occurrence of a viewpoint movement in the direction indicated by the arrow 205 is input to the viewpoint-information input unit 21 based on a user's operation, in step S11, the viewpoint-information transmitting unit 23 notifies the picture transmitting apparatus 1 of the viewpoint movement by using the network 3. If the viewpoint-information transmitting unit 23 immediately notifies the picture transmitting apparatus 1 of the viewpoint movement after the viewpoint movement occurs, a certain time (hereinafter referred to as a "response time TD") is required until the picture receiving apparatus 2 receives a picture reflecting the viewpoint movement, due to a reason such as a delay in transmission on the network 3 and a delay in processing by the picture transmitting apparatus 1. During a period (the response time TD) until the picture reflecting the viewpoint change reaches the picture receiving apparatus 2, the display-picture control unit 22 determines a picture 207 in a new display position matching the direction of the movement, and displays the picture 207 on the picture output unit 25.

In step S3, in the picture transmitting apparatus 1, based on the viewpoint-movement information received through the viewpoint-information receiving unit 13, the stream control unit 12 immediately determines a picture 208 in the position of the next picture to be transmitted, inputs the picture 208 from the picture input unit 11, and transmits the picture 208 from the stream transmitting unit 14.

When receiving the picture 208, which reflects the viewpoint movement, through the stream receiving unit 24, the display-picture control unit 22 in the picture receiving apparatus 2 stores the received picture 208, and determines and extracts, from the stored picture 208, a picture 210 in the position corresponding to the coordinates (viewpoint) input from the viewpoint-information input unit 21. The display-picture control unit 22 outputs and displays the extracted picture 208 on the picture output unit 25. The above operations are continuously executed by the picture transmitting apparatus 1 and the picture receiving apparatus 2.

Figure 3:
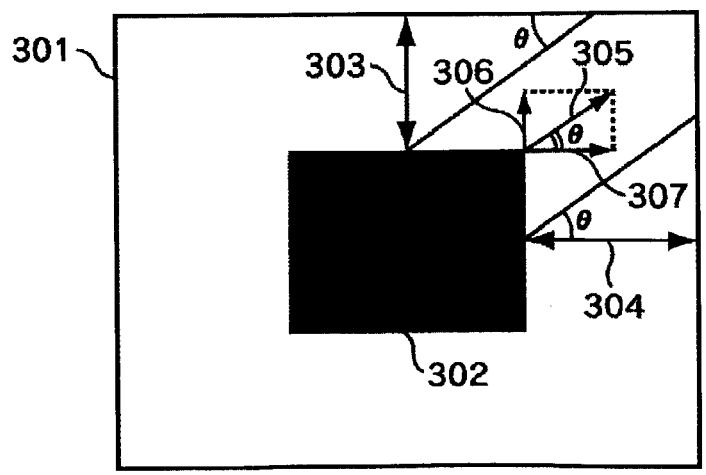
FIG. 3 is an illustration of principles of viewpoint movement control.

FIG. 3 shows viewpoint movement control using the relationship between received (transmitting) picture size and displayed picture size. As shown in FIG. 2, after the picture receiving apparatus 2 transmits a viewpoint movement notification, the viewpoint movement cannot be immediately reflected in a received picture. Thus, within the response time TD, control must be performed so that a displayed picture 302 is not positioned out of the frame of a received picture 301. The display-picture control unit 22 employs, as this control, any one of the following methods.

In a first method, the upper limit of a viewpoint moving speed in the picture receiving apparatus 2 is set based on displayed picture margins (the vertical margin 303 and the horizontal margin 303 in FIG. 3) and the response time TD. The vertical margin 303 represents the distance between a horizontal end (the upper end in the example of FIG. 3) of the displayed picture 302 and a horizontal end (the upper end in the example of FIG. 3) of the received picture 301. The margin 304 represents the distance between a vertical end (the right end in FIG. 3) of the displayed picture 302 and a vertical end (the right end in FIG. 3) of the received picture 301.

In this case, the upper limit of the viewpoint moving speed is defined by the following expression:

$$\text{(Upper Limit of Viewpoint Moving Speed)} \leq \text{(Picture Margin)}/\text{(Response Time)} \quad (1)$$

When the movement direction is arbitrary, the movement direction is decomposed into a horizontal component and a vertical component for calculation. For example, as shown in FIG. 3, when the viewpoint moves in the direction indicated by the arrow (motion vector) 305, the movement direction of the motion vector 305 is decomposed into a horizontal component 307 and a vertical component 306 for calculation. When the angle between the movement direction and the horizontal direction is represented by θ, the following expression holds:

$$\text{(Moving Speed in θ Direction)} \leq \text{Min}(\text{Horizontal Component 304}/\cos θ, \text{Vertical Component 303}/\sin θ)/\text{Response Time} \quad (2)$$

where Min (A, B) represents the minimum between A and B, and the horizontal component 304 and the vertical component 303 represent the absolute values of lengths, respectively. Similarly, expression (2) can be applied to viewpoint zooming-in or zooming-out by assuming that the displayed picture moves in four directions.

In a second method, the transmitting picture size is set based on the response time, with the viewpoint moving speed regarded as constant. In this case, transforming expression (1) gives the following expression:

$$\text{(Picture Margin)} \geq \text{(Viewpoint Moving Speed)} \times \text{(Response Time)} \quad (3)$$

Thus, the transmitting picture size is represented by the following expression:

$$\text{(Transmitting Picture Size)} \geq \text{(Viewpoint Moving Speed)} \times \text{(Response Time)} + \text{(Displayed Picture Size)} \quad (4)$$

In a third method, the number of pixels is set based on the response time, with the transmission picture size and the viewpoint moving speed regarded as constant. By transforming expression (4), while paying attention to the following points:

displayed picture size=the number of displayed pixels; and
   transmitting picture size=received picture size, the following expression is obtained:

$$\text{(Number of Displayed Pixels)} \leq \text{(Received Picture Size)} - \text{(Viewpoint Moving Speed)} \times \text{(Response Time)} \quad (5)$$

In this case, it is possible that the third method be combined with processing such as enlargement by digital zooming of superficial displayed-picture size for a reduction in the number of displayed pixels.

In a fourth method, the above first to third methods are flexibly switched in proportional to the length of the response time. In the case of a long response time, there is a possibility that the first method may cause a very delayed viewpoint movement. Accordingly, a method of switching to the second method is possible.

The response time used in the fourth method is shown as follows:

Response Time=Buffering Time in Picture Receiving Apparatus 2+Round Trip (Transmission Delay) Time on Network (RTT)+Processing Time in Picture Transmitting Apparatus 1

Each value is made known by exchanging monitoring information between the picture transmitting apparatus 1 and the picture receiving apparatus 2.

Also, the RTT included in the response time can be measured by the following manner. Measurement of an RTT using Real-time Control Protocol (RTCP) uses a sender report (SR) which is periodically transmitted from the picture transmitting apparatus 1 to the picture receiving apparatus 2 and a receiver report (RR) with which the picture receiving apparatus 2 responds to the picture transmitting apparatus 1. Each of the SR and the RR is one of messages in RTCP. In the SR, its transmission time is written, and in the RR, the transmission time written in the SR and a time up to transmission of the RR after receiving the SR are written.

Figure 4:
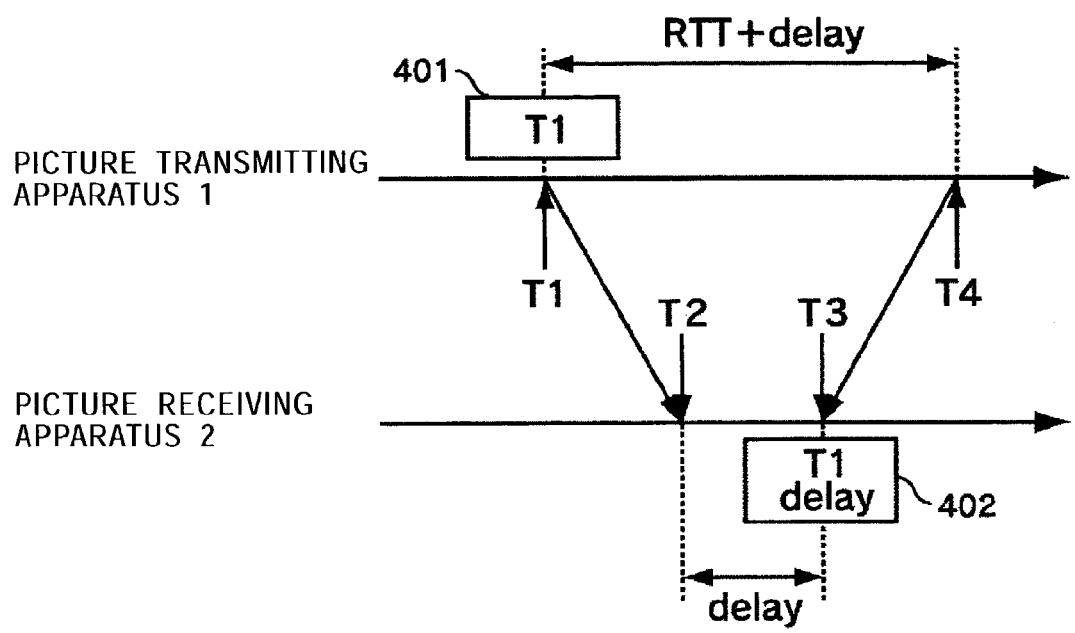
FIG. 4 is an illustration of RTT measurement processing based on RTCP.

FIG. 4 shows that the picture transmitting apparatus 1 and the picture receiving apparatus 2 exchange an SR and an RR. At time T1, the picture transmitting apparatus 1 transmits an SR 401 to the picture receiving apparatus 2. Then, in the SR 401, the transmission time T1 is written. The display-picture control unit 22 in the picture receiving apparatus 2 receives the SR 401 at time T2, calculates a one-way delay time (RTT/2) by using the following expression:

$$\text{One-way Delay Time } (RTT/2) = T2 - T1 \quad (6)$$

and generates an RTT by doubling the one-way delay time.

This processing is based on the assumption that the internal clocks of the picture transmitting apparatus 1 and the picture receiving apparatus 2 synchronize with each other. Although a method for establishing the synchronization between the internal clocks is not described, the synchronization can be established by using Network Time Protocol (NTP) which is commonly used in the Internet, or an original protocol for NTP.

After a predetermined time ("delay") elapses, at time T3, the picture receiving apparatus 2 transmits the RR 402. Then, in the RR 402, the transmission time T1 and a time (delay=T3–T2) from reception of the SR 401 up to transmission of the RR 402 are written. The stream control unit 12 in the picture transmitting apparatus 1 receives the RR 402 at the time T4, and calculates an RTT by using the following expression:

$$RTT = T4 - T1 - \text{delay} = T4 - T1 - (T3 - T2) \quad (7)$$

In the calculation of the RTT by the picture transmitting apparatus 1, the synchronization between the internals clocks of the picture transmitting apparatus 1 and the picture receiving apparatus 2 does not always need to be established because the RR includes the "delay" time. The method in expression (7) is also described in RFC (Request for comments) 1889.

As described above, by using the present invention, when multi-viewpoint pictures, such as omnidirectional pictures, are distributed by the network 3, bands used on the network 3 and the processing load in a receiving terminal can be reduced, so that picture-spatial service on a basis of omnidirectional pictures can be provided even to relatively narrow band networks such as wireless networks and powerless terminals such as personal digital assistants (PDAs) and cellular phones.

In a case in which the pictures are based on Motion JPEG (Joint Photographic Experts Group) 2000, when a partial picture is distributed, it is not necessary to separately distribute information indicating that the distributed picture corresponds to which of the entire picture because JPEG 2000 has a tile division function as an encoding function for dividing a screen into partial screens, so that the protocol between the transmitter and the receiver can be simplified, thus enabling facilitated control of viewpoint movement.

Next, a specific example for realizing the above-described system is described. At first, the data format of omnidirectional pictures are described. The picture input unit 11 converts the data format of omnidirectional pictures into a cylindrical picture format. The picture input unit 11 uses JPEG 2000 as a picture compressing method. The use of JPEG 2000 produces the following advantages.

JPEG 2000 is suitable for transmission of omnidirectional pictures because it does not need the difference between image frames. As in omnidirectional pictures, when picture size constituting the entire space is very large, a partial picture in an arbitrary viewpoint direction is only shown, and the viewpoint is moved at random by the user, prediction encoding used in MPEG or the like is almost useless. Also, when considering transmission on the Internet, MPEG which needs interframe difference has a problem in that, when a packet loss occurs, an error is transmitted to the subsequent frames. This problem does not occur in JPEG 2000 since it does not need interframe difference.

In JPEG 2000, after a picture is divided into a plurality of arbitrary areas called "tiles", only some tiles can be decoded. Each tile size can be set to be constant in a size designated in an encoding mode, and the tile size is described in a header in JPEG 2000. In addition, index numbers are assigned to the tiles from the top left to bottom right of the entire picture. Accordingly, the numbering has an advantage in that knowing a tile index number can easily specify which portion of the entire picture the tile picture is. Moreover, each portion can be separately encoded. Thus, by controlling encoding of a picture so that the quality of portions (e.g., the upper end and lower end of a spatial picture mapped in a cylindrical shape) to which the user does not pay a lot of attention is reduced to increase a compression factor, more storage area and network bandwidths can be saved.

Figure 5:
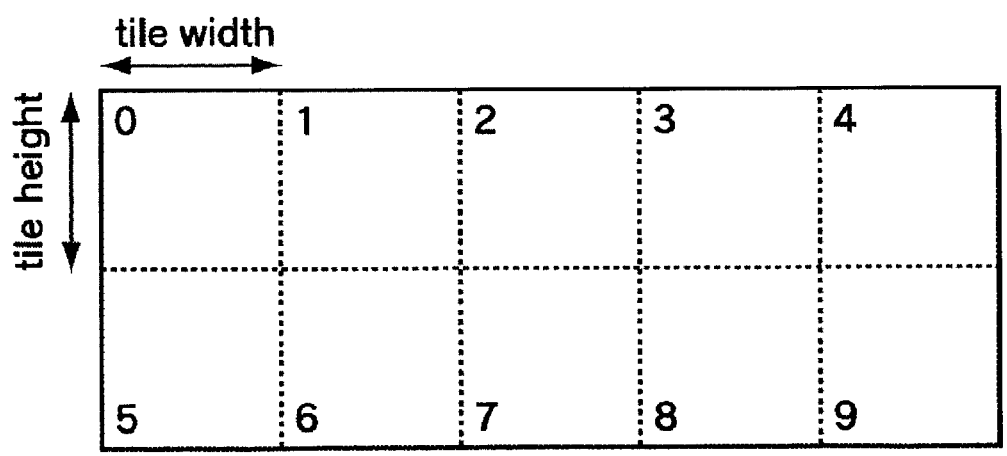
FIG. 5 is an illustration of picture division into tiles.

As described with reference to FIG. 2, this picture distribution system uses a method for distributing a viewpoint picture and a picture (e.g., the image 202 in FIG. 2) which consists of an arbitrary number of tiles and which includes its periphery. Only the required number of tiles can be distributed because JPEG 2000 has a function in which, even if a truncate image is input to a decoder (the display-picture control unit 22), it can be decoded. FIG. 5 shows an example in which an image is divided into ten tiles. The tiles are sequentially numbered 0 to 9 as index numbers. Accordingly, for example, the coordinates of the top left of the tile image of index 3 can be easily known as (tile_width×3, 0). As shown in FIG. 5, "tile_width" represents a tile width, and "tile-height" represents a tile height.

Next, a protocol for use in viewpoint movement is described. In a protocol, used between the picture receiving apparatus 2 (client) and the picture transmitting apparatus 1 (server) when the viewpoint in the picture receiving apparatus 2 changes, the following points are considered. Although an example of Real Time Streaming Protocol (RTSP) in extended form is described here, a new original protocol may be designed. Since extension of RTSP generates portions in stream control which can be used in common, it is only required to define simple commands.

Conditions for consideration are as follows:
(1) A viewpoint-moving request must be transmitted by using a reliable communication link or a communication protocol. This corresponds to the TCP.
(2) A viewpoint moving direction or a motion vector must be transmitted from the client to the server. The motion vector includes not only a direction of movement but also representation of a movement (moving speed) per unit time.
(3) It is preferable for the server to notify the client of estimated arrival information of a partial picture reflecting the viewpoint-moving request. The estimated arrival information is information that the client should know beforehand and that indicates from which packet the coordinates of a received picture will change. In the case of using RTP to transmit pictures, the estimated arrival information includes time-stamp information and sequence numbers of RTP packets. By allowing the client to know the estimated arrival information beforehand, the upper limit of the viewpoint moving speed on the receiving side can be easily determined.

(4) It is preferable that a partial picture to be transmitted be easily re-formed.

(5) It is preferable that the coordinates of a received partial picture be easily found.

Next, a specific example of the protocol is described. The extended RTSP is described below. The details of RTSP are disclosed in RFC 2326. RTSP controls delivery of real-time data in the application level, and can use TCP as a transport-layer protocol. This satisfies the above condition (1).

RTSP, PLAY, STOP, PAUSE, etc., are defined as stream-control commands, but a watching and listening method such as viewpoint movement is not assumed. Accordingly, new commands corresponding to viewpoint movement are defined. RTSP has a lot of extensibility, and new commands can be easily defined. Command adding techniques can include a technique for adding new parameters to conventionally existing methods (PLAY, STOP, PAUSE, etc.), and a technique for adding a new method. Between these, the technique for adding a new method is preferable because a new state is generated by adding a command. Accordingly, an example of the method addition is described below. However, the technique for adding new parameters has an advantage in that mounting is simplified, compared with the method addition.

Figure 6:
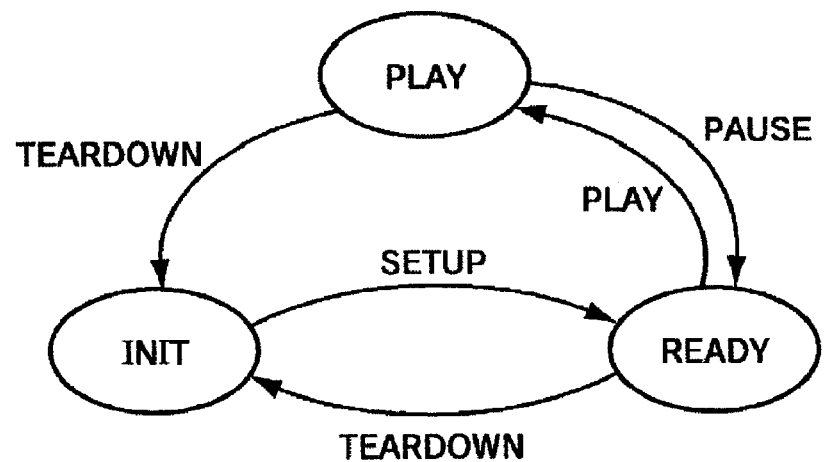
FIG. 6 is an illustration of state changes of RTSP.
Figure 7:
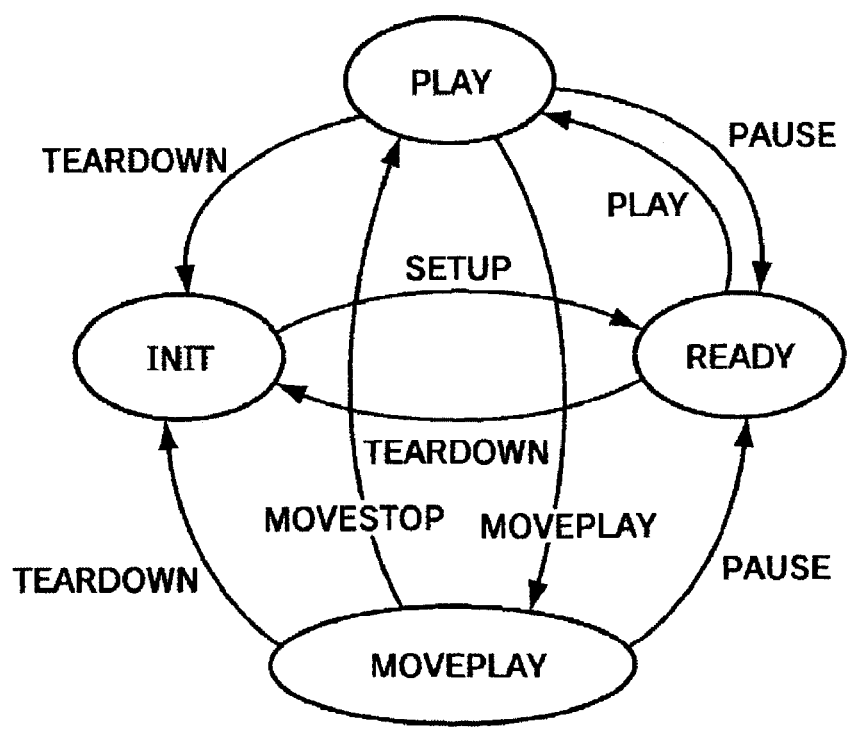
FIG. 7 is an illustration of state changes of RTSP when the method MOVEPLAY is added.

RTSP has state transition as shown in FIG. 6. By adding a viewpoint moving command, the state transition is changed to that shown in FIG. 7. In FIGS. 6 and 7, the encircled portions indicate states, and the arrows indicate changes. An explanation of each arrow is a method name, and the arrow indicates that activation of the method causes a state change.

By way of example, in the RTSP state transition shown in FIG. 6, by activating the method TEARDOWN in the PLAY state, the state is changed into the INIT state. Also, by activating the PAUSE state in the PLAY state, the state is changed into the READY state. The INIT state is changed into the READY state by activating the method SETUP. The READY state is changed into the INIT state by activating the method TEARDOWN, and is changed into the PLAY state by activating the method PLAY.

In the RTSP state transition (shown in FIG. 7) to which the method MOVEPLAY is added, in addition to the state changes shown in FIG. 6, state changes occur among the MOVEPLAY state, the INIT state, the PLAY state, and the READY state.

Specifically, the MOVEPLAY state is changed into the INIT state by activating the method TEARDOWN, is changed into the PLAY state by activating the method MOVEPLAY, and is changed into the READY state by activating the method PAUSE. The PLAY state is changed into the MOVEPLAY state by activating the method MOVEPLAY.

In the present invention, the method MOVEPLAY is added. MOVEPLAY is a method designating viewpoint movement, and is sent at the start of viewpoint movement. Parameters interpreted by the method MOVEPLAY are identical to those of the method PLAY, but differ from those of the method PLAY in vector parameters representing viewpoint movement and zoom parameters representing zooming. When the motion vector of the viewpoint or zooming factor does not change, and when viewpoint movement is continuously performed, it is not necessary to sent the method MOVEPLAY to the server again.

Next, the vector parameter is described. Occurrence of the viewpoint movement causes the client to send, to the server, the following request:

MOVEPLAY rtsp://video.example.com/video RTSP/1.0
Cseq: 835
Session: 123456
Vector:xy 10-30

The first viewpoint-movement stopping request designates a moving speed of zero.

The common format of the vector parameter is as follows:
Vector:xy (Moving Speed in X-axis Direction) [(Moving Speed in Y-axis Direction)] or
Vector:polar (Rotational Angle with X-axis set to 0°) [(Moving Speed)]

For example, when the X-Y coordinate system is used for designation such as "vector:xy 10-30", the designation indicates that viewpoint movement is performed at a speed of 10 pixels in the X direction (the right direction) and −30 pixels (i.e., downwardly 30 pixels) in the Y direction (the upward direction) per unit time (one second) in the X-Y coordinate system. When the moving speed in the Y direction is zero, the representation for the Y axis may be omitted.

Also, for example, when the polar coordinate system is used to designate a motion vector, the designation indicates that viewpoint movement is performed at a speed of 20 pixels in an anticlockwise 90-degree direction (upward) per unit time (one second). When the viewpoint moving speed is fixed, designation is easier in the polar coordinate system than in the X-Y coordinate system. When the moving speed is fixed, and the agreement between the server and the client is obtained as an application specification or by negotiation at the start of a session, the moving speed may be omitted.

Next, the zoom parameter is described. The zoom parameter is used to request zooming in or zooming out, and is treated similarly to the vector parameter. The zoom parameter is shown as follows:

Zoom:(Zoom Speed)

In this zoom parameter, a positive value equal to zero or greater is set as the zoom speed. The value 1.0 represents 1× magnification zooming, a value greater than 1.0 represents zooming in (enlarging direction), and a value less than 1.0 represents zooming out (reducing direction). An enlargement factor or a reduction factor is greater as it is further than 1.0. For example, in the case of a zooming speed of 2.0, the speed represents zooming a double magnification per frame, and in the case of a zooming speed of 3.0, the speed represents zooming at a triple speed per frame. The server responds with an error when a zooming speed equal to zero or less is designated, or further zooming is impossible.

Next, the method MOVESTOP is described. The method MOVESTOP is a command designating a viewpoint-movement stop and is used to stop viewpoint movement. Parameters interpreted by the method MOVESTOP are similar to those interpreted by the method STOP.

Next, replies of the server are described. When the server receives the method MOVEPLAY or MOVESTOP, and cannot interpret the received method, it replies with "Method Not Allowed" as defined in RFC 2326. When the server can interpret the method, it replies in accordance with the method PLAY or STOP. In order to indicate from which sequence the request is reflected, the replay include the following RTP-Info header:

RTSP/1.0 200 OK
Cseq:835
Session:123456
RTP-Info:url=rtsp://video.examplecompany/video; seq=3456;rtptime=789012

In order to fulfill the roll of transmitting a picture in response to a request from the picture receiving apparatus 2, the picture transmitting apparatus 1 has state transition similar to that in RTSP. Accordingly, the picture transmitting apparatus 1 has four states, the INIT state, the READY state, the PLAY state, and the MOVEPLAY state. Processes corresponding to the four states are shown in FIGS. 8 to 11. Step S12 (FIG. 8) in the INIT state, steps S51, S52, and S55 (FIG. 10) in the PLAY state, and the entire process (FIG. 11) of the MOVEPLAY state added steps added by extending the RTSP method.

Figure 8:
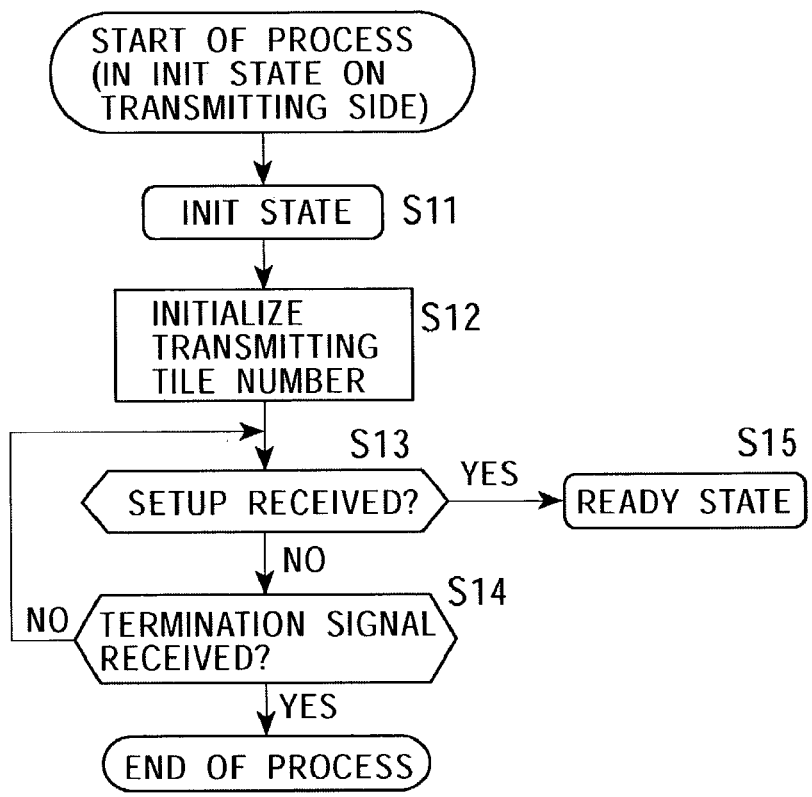
FIG. 8 is a flowchart illustrating a process performed in the INIT state of a picture transmitting apparatus 1.

As shown in FIG. 8, after the process is started, the stream control unit 12 sets the INIT state in step S11, and executes initialization of transmitting tile numbers in step S12. In step S13, the stream control unit 12 determines whether the method SETUP has been received. If it has not been received yet, in step S14, the stream control unit 12 determines whether a termination signal has been received. If the termination signal has not been received, the stream control unit 12 returns to step S13, and repeats the subsequent steps. In step S13, if it is determined that the method SETUP has been received, the stream control unit 12 proceeds to step S15, and the state is changed into the READY state (FIG. 7). In step S14, if it is determined that the termination signal has been received, the process ends.

Figure 9:
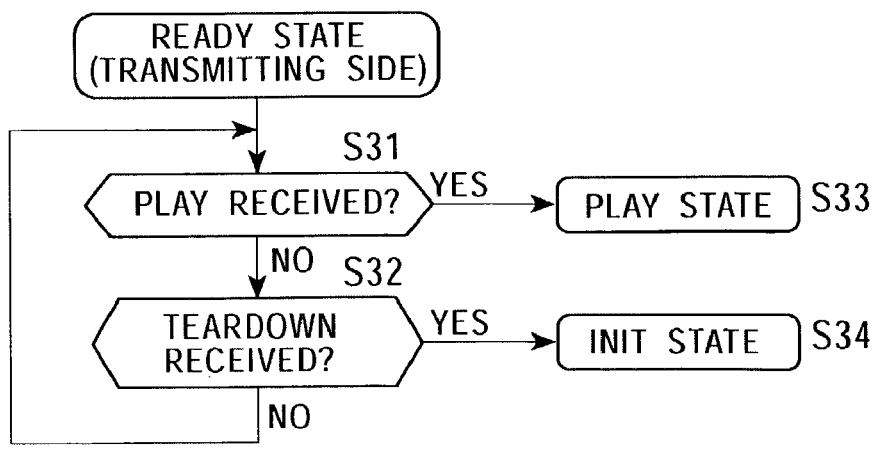
FIG. 9 is a flowchart illustrating a process performed in the READY state of the picture transmitting apparatus 1.

In the READY state shown in FIG. 9, in step S31, the stream control unit 12 determines whether the method PLAY has been received. If it has not been received yet, the stream control unit 12 proceeds to step S32, and determines whether the method TEARDOWN has been received. If it is determined that the method TEARDOWN has not been received, the stream control unit 12 returns to step S31, and repeats the subsequent steps.

In step S31, if it is determined that the method PLAY has been received, the stream control unit 12 proceeds to step S33, and changes the state into the PLAY state (FIG. 7). In step S32, it is determined that the method TEARDOWN has been received, the stream control unit 12 proceeds to step S34, and changes the state into the INIT state (FIG. 7).

Figure 10:
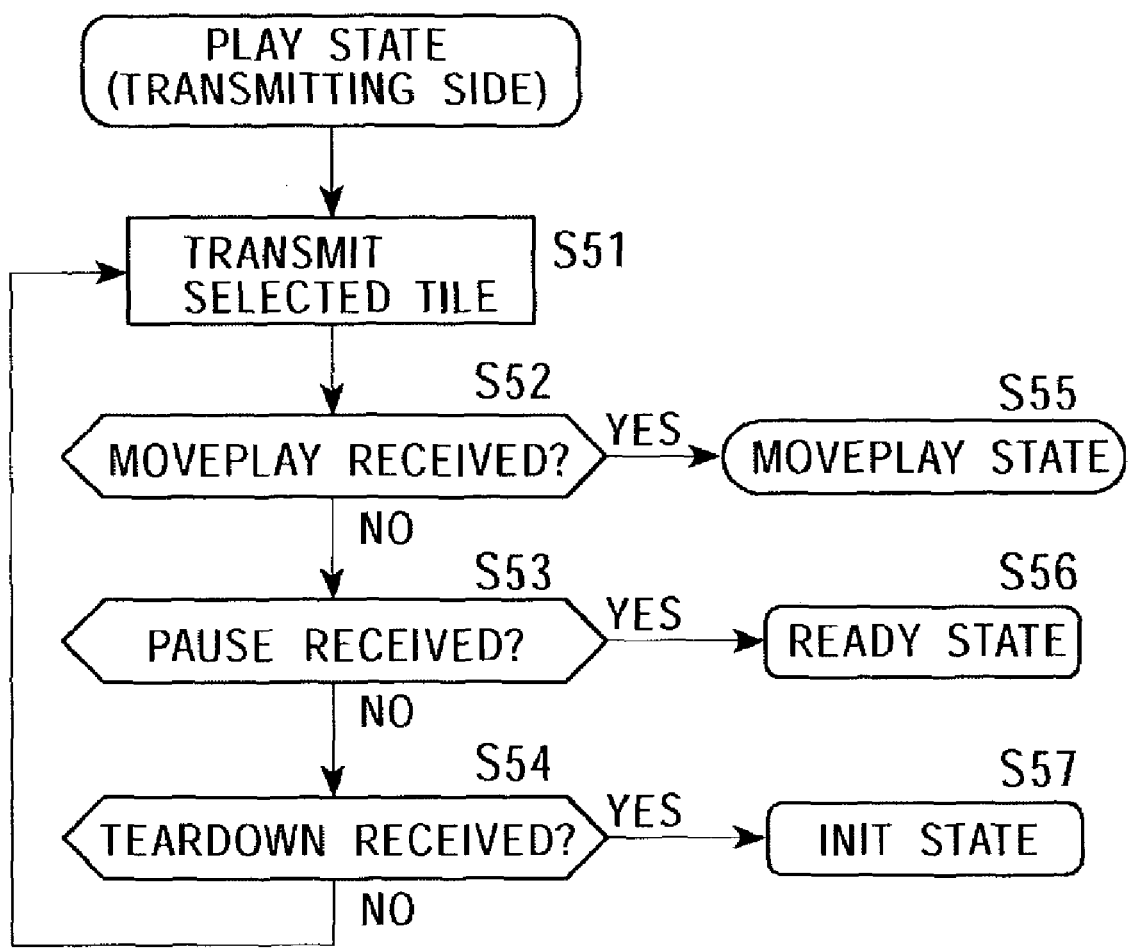
FIG. 10 is a flowchart illustrating a process performed in the PLAY state of the picture transmitting apparatus 1.

In the PLAY state shown in FIG. 10, in step S51, the stream control unit 12 transmits a selected tile. In step S52, the stream control unit 12 determines whether the method MOVEPLAY has been received. If the method MOVEPLAY has been received, the stream control unit 12 proceeds to step S55, and changes the state into the MOVEPLAY state (FIG. 7). In step S52, if it is determined that the method MOVEPLAY has not been received, the stream control unit 12 proceeds to step S53, and determines whether the method PAUSE has been received. If it is determined that the method PAUSE has been received, the stream control unit 12 proceeds to step S56, and changes the state into the READY state (FIG. 7).

In step S53, if it is determined that the method PAUSE has not been received, the stream control unit 12 proceeds to step S54, and determines whether the method TEARDOWN has been received. If the method TEARDOWN has been received, the stream control unit 12 proceeds to step S57, and changes the state into the INIT state (FIG. 7). In step S54, if it is determined that the method TEARDOWN has not been received, the stream control unit 12 returns to step S51, and repeats the subsequent steps.

Figure 11:
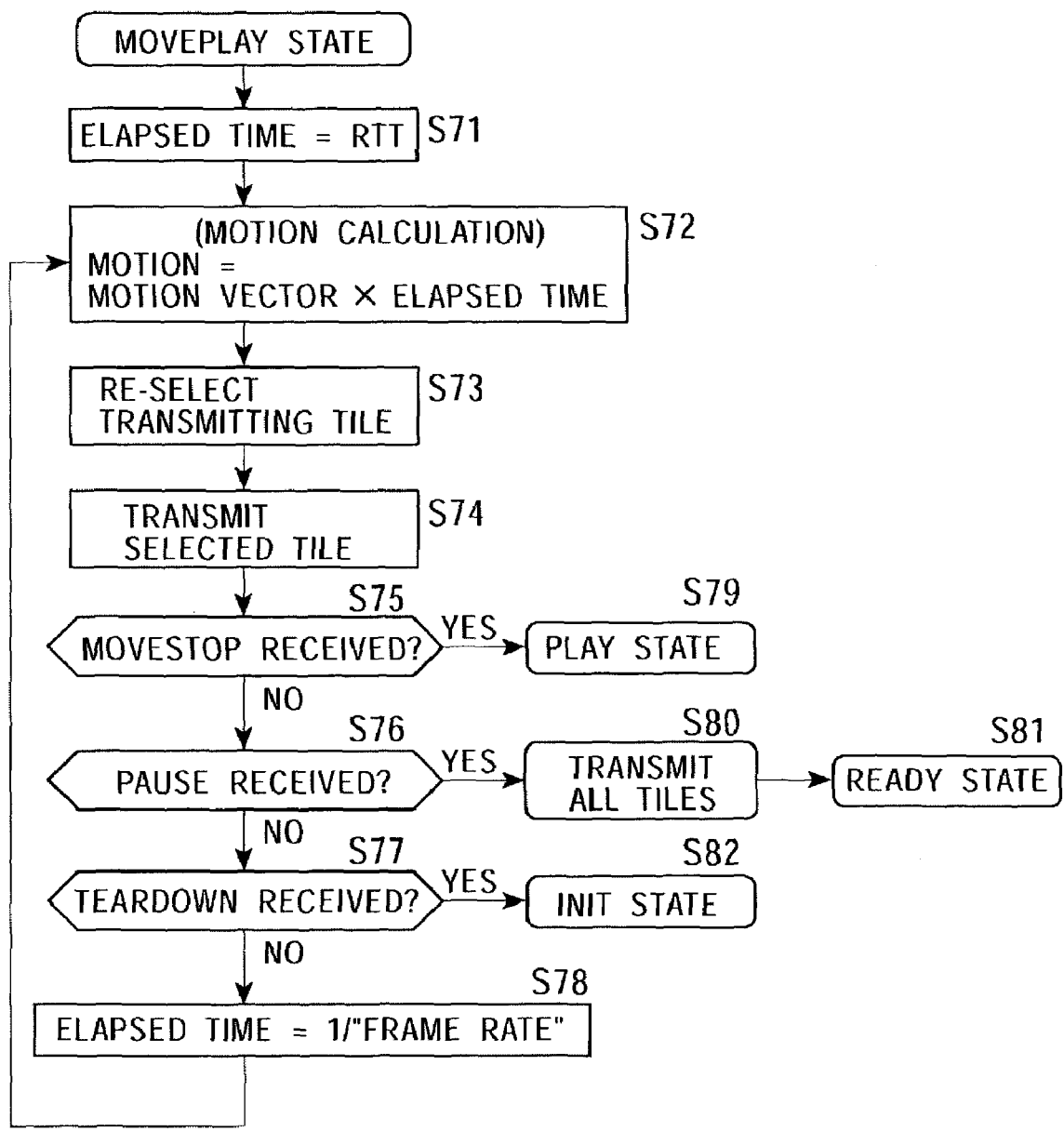
FIG. 11 is a flowchart illustrating a process performed in the MOVEPLAY state of the picture transmitting apparatus 1.

In the MOVEPLAY state shown in FIG. 11, in step S71, the stream control unit 12 sets RTT in the elapsed time. The RTT is a measured value described with reference to FIG. 4. In step S72, the stream control unit 12 calculates a motion based on the following expression:

$$\text{Motion} = \text{Motion Vector} \times \text{Elapsed Time}$$

The value set in step S71 is used as the elapsed time.

In step S73, the stream control unit 12 executes the process for selecting a transmitting tile again. In step S74, the stream control unit 12 controls the stream transmitting unit 14 to transmit the transmitting tile selected in step S73. In step S75, the stream control unit 12 determines whether the method MOVESTOP has been received. If it has been received, in step S79, the stream control unit 12 changes the state into the PLAY state (FIG. 7).

In step S75, if the method MOVESTOP has not been received, the stream control unit 12 proceeds to step S76, and determines whether the method PAUSE has been received. If it is determined that the method PAUSE has been received, the stream control unit 12 proceeds to step S80, and executes transmission of all the tiles. In step S81, the stream control unit 12 changes the state into the READY state (FIG. 7).

In step S76, if the method PAUSE has been received, the stream control unit 12 proceeds to step S77, and determines whether the TEARDOWN has been received. If it is determined that the method TEARDOWN has been received, the stream control unit 12 proceeds to step S80 and changes the state into the INIT state (FIG. 7).

In step S77, if it is determined that the method TEARDOWN has been received, the stream control unit 12 proceeds to step S78 and sets the reciprocal of the frame rate in the elapsed time. After that, the stream control unit 12 returns to step S72, and repeats the subsequent steps.

Figure 12:
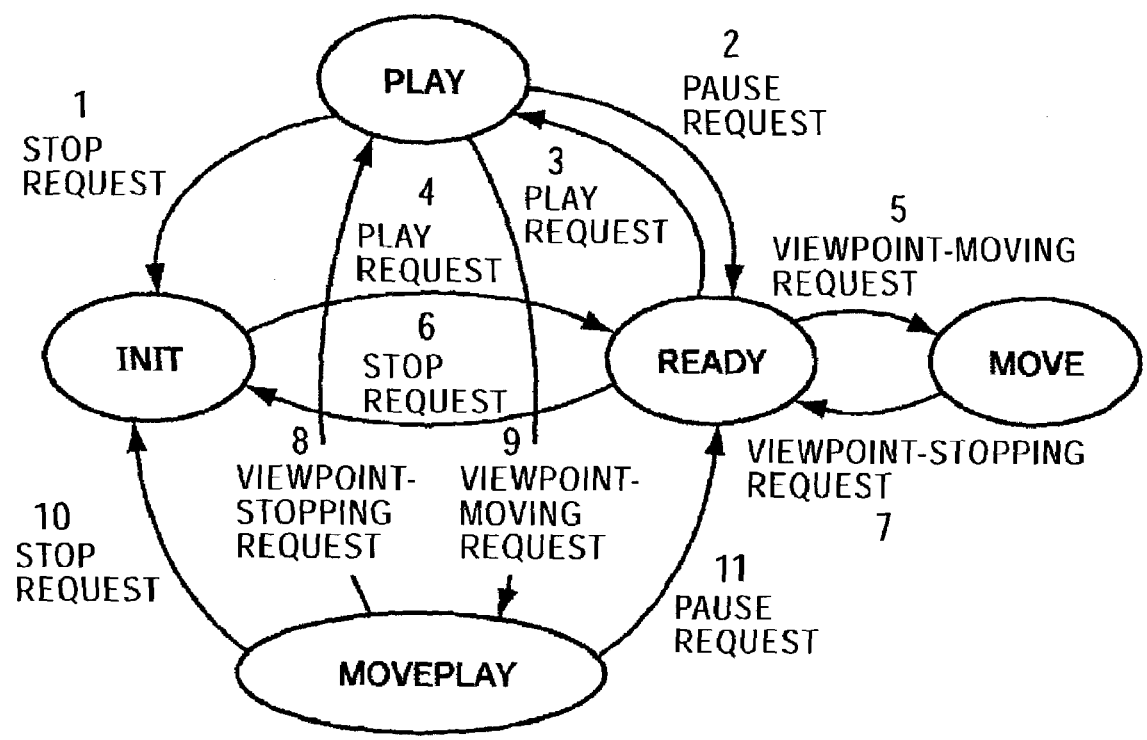
FIG. 12 is an illustration of state changes in a picture receiving apparatus 2.

The picture receiving apparatus 2 must respond to an interactive request from the user other than the protocol operations with the picture transmitting apparatus 1. Accordingly, in the picture receiving apparatus 2, the MOVE state, which is a closed state in the picture receiving apparatus 2, is added to the states in FIG. 7 of the transmitting side, so that the picture receiving apparatus 2 has state transition shown in FIG. 12. Each state in FIG. 12 is identical in meaning to that in FIG. 7. A state change is performed in response to a user's request. The arrows of the state changes are labeled user's requests.

In the example in FIG. 12, when a STOP request is made in the PLAY state, the PLAY state is changed into the INIT state. When a PAUSE request is made, the PLAY state is changed into the READY state. When a viewpoint-moving request is made, the PLAY state is changed into the MOVEPLAY state.

When a PLAY request is made in the INIT state, the INIT state is changed into the READY state. When a PLAY request is made in the READY state, the READY state is changed into the PLAY state. When a STOP request is made, the READY state is changed into the INIT state. When a viewpoint-moving request is made, the READY state is changed into the READY state.

When a viewpoint stopping request is made in the MOVE state, the MOVE state is changed into the READY state. When a STOP request is made in the MOVEPLAY state, the MOVEPLAY state is changed into the INIT state. When a viewpoint stopping request is made, the MOVEPLAY state is changed into the PLAY state. When a PAUSE request is made, the MOVEPLAY state is changed into the READY state.

FIGS. 13 to 17 show processes for the states. Steps S123, S125, S129, and S130 (FIG. 14) in the READY state, steps S142, S143, S146, and S147 (FIG. 15) in the PLAY state, and the entire processes of the MOVEPLAY state (FIG. 16) and the MOVE state (FIG. 17) are added processes. In the MOVE state, no messages are exchanged with the picture transmitting apparatus 1.

Figure 13:
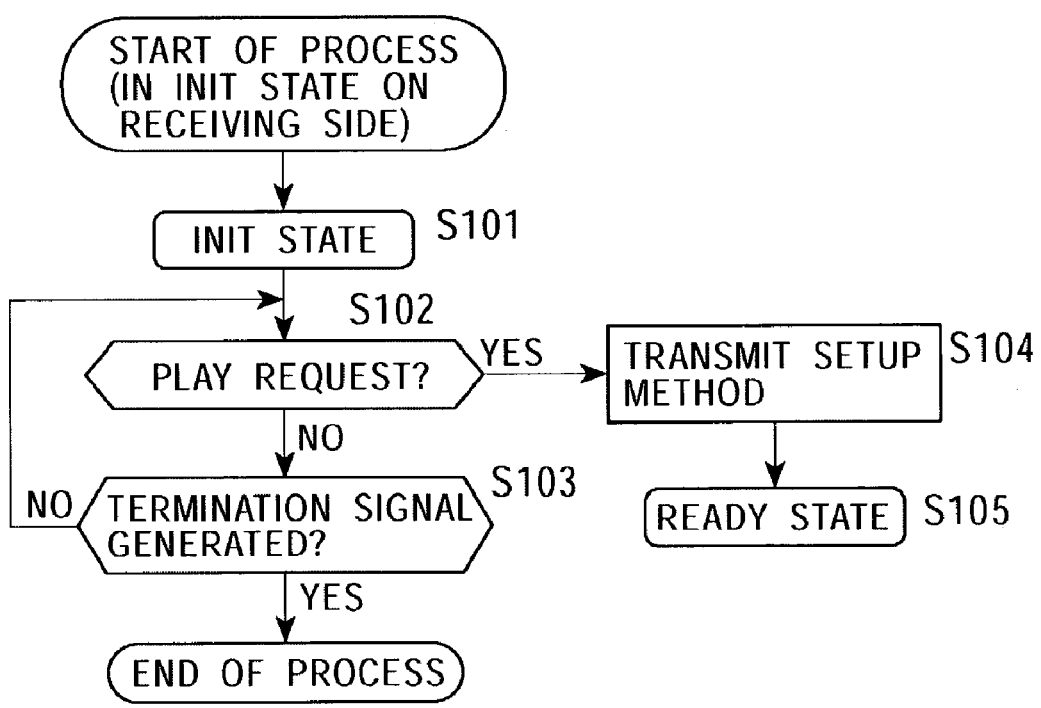
FIG. 13 is a flowchart illustrating a process performed in the INIT state of the picture receiving apparatus 2.

Referring to the INIT state in FIG. 13, in step S101, the INIT state is set. In step S102, the display-picture control unit 22 determines whether a PLAY request has been made. If it is determined that the PLAY request has been made, the process proceeds to step S104, and the display-picture control unit 22 executes transmission of the method SETUP. In step S105, the display-picture control unit 22 changes the state into the READY state (FIG. 12).

In step S102, if it is determined that the PLAY request has not been made, the process proceeds to step S103, and the display-picture control unit 22 determines whether a termination signal has been generated. If it is determined that the termination signal has not been generated, the process returns to step S102, and the subsequent steps are repeatedly executed. If it is determined that the termination signal has been generated, the process is terminated.

Figure 14:
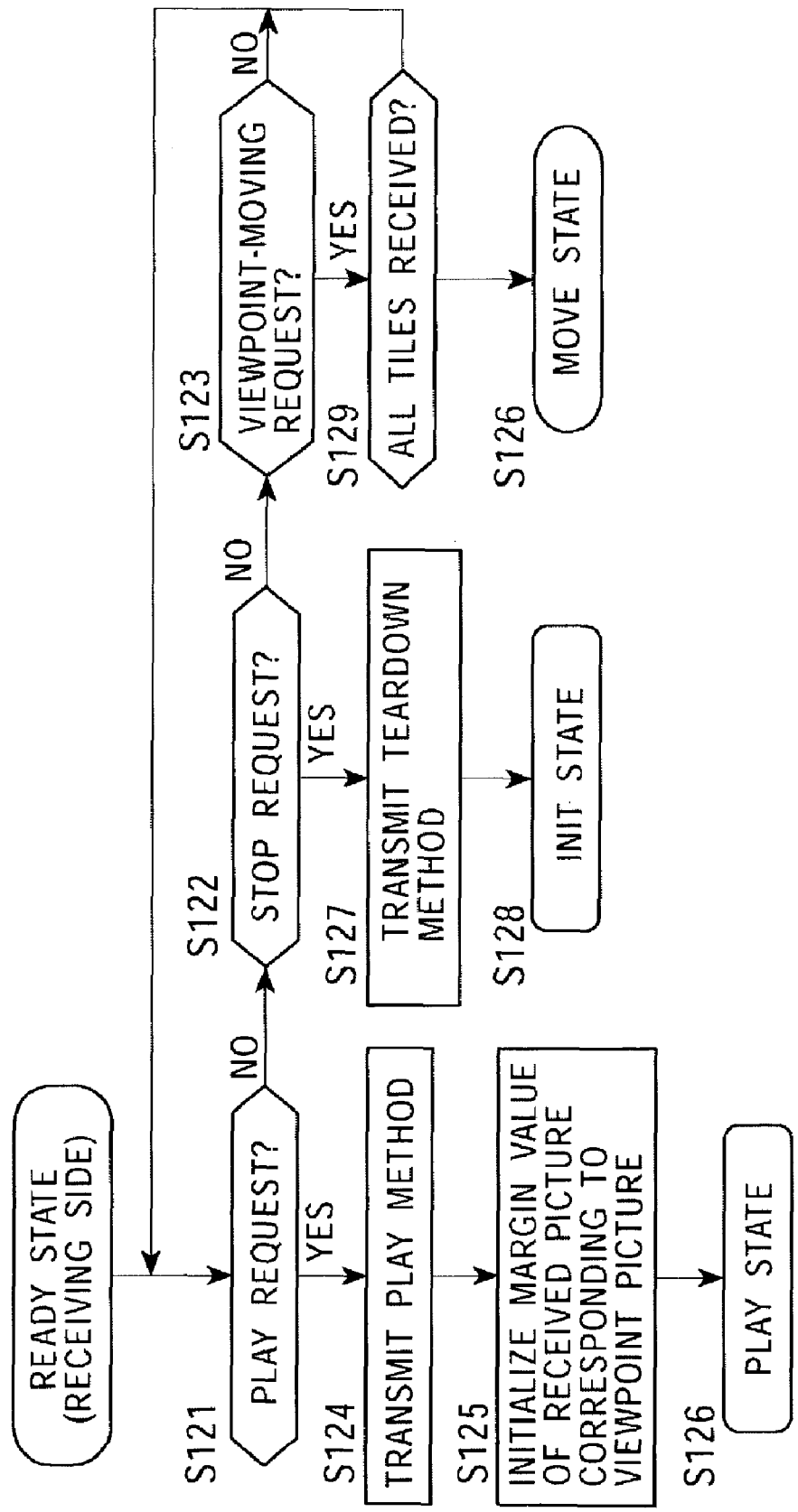
FIG. 14 is a flowchart illustrating a process performed in the READY state of the picture receiving apparatus 2.

In the READY state in FIG. 14, the display-picture control unit 22 determines in step S121 whether a PLAY request has been made. If it has not been made, in step S122, the display-picture control unit 22 determines whether a STOP request has been made. If it has not been made, the display-picture control unit 22 proceeds to step S123 and determines whether a viewpoint-moving request has been made. If it is determined that the viewpoint-moving request has also not been made, the subsequent steps are repeatedly executed.

In step S121, if it is determined that the PLAY request has been made, the display-picture control unit 22 proceeds to step S124 and transmits the method PLAY. In step S125, the picture receiving apparatus 2 executes initialization of a margin value of a received picture corresponding to a viewpoint picture. After that, the display-picture control unit 22 proceeds to step S126 and changes the state into the PLAY state (FIG. 12).

In step S122, if it is determined that the STOP request has been made, the display-picture control unit 22 proceeds to step S127 and transmits the method TEARDOWN. In step S128, the display-picture control unit 22 changes the state into the INIT state (FIG. 12).

In step S123, if it is determined the viewpoint-moving request has been made, the display-picture control unit 22 proceeds to step S129 and determines whether all the tiles have been received. If they have not been received, the display-picture control unit 22 returns to step S121 and continuously executes the subsequent steps. In step S129, if it is determined that all the tiles have been received, the display-picture control unit 22 proceeds to step S130 and changes the state into the MOVE state (FIG. 12).

Figure 15:
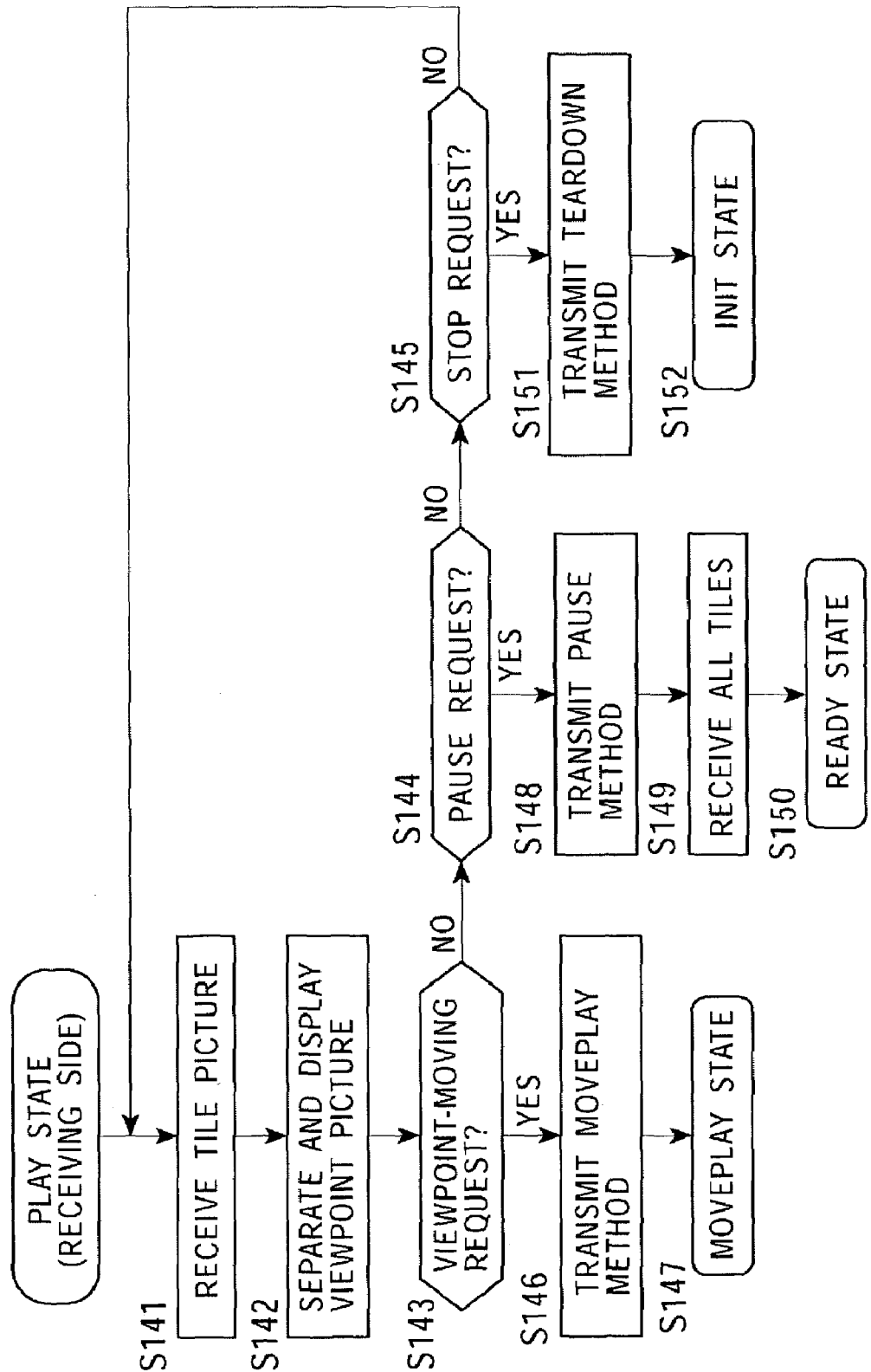
FIG. 15 is a flowchart illustrating a process performed in the PLAY state of the picture receiving apparatus 2.

In the PLAY state in FIG. 15, in step S141, the display-picture control unit 22 receives a tile picture. In step S142, the display-picture control unit 22 separates a portion corresponding to the viewpoint picture from the tile picture received and stored in the built-in memory in step S141, and outputs and displays the separated portion on the picture output unit 25.

In step S143, the display-picture control unit 22 determines whether the viewpoint-moving request has been made. If it has not been made, the display-picture control unit 22 proceeds to step S144 and determines whether the PAUSE request has been made. When determining that even the PAUSE request has not been made, the display-picture control unit 22 proceeds to step S145 and determines whether the STOP request has been made. If it has not been made, the display-picture control unit 22 returns to step S141, and repeatedly executes the subsequent steps.

In step S143, if it is determined that the viewpoint-moving request has been made, the display-picture control unit 22 proceeds to step S146 and executes transmission of the method MOVEPLAY. In step S147, the display-picture control unit 22 changes the state into the MOVEPLAY state (FIG. 12).

In step S144, if it is determined that the PAUSE request has been made, the display-picture control unit 22 proceeds to step S148 and transmits the method PAUSE. The display-picture control unit 22 executes, in step S149, reception of all the tiles through the stream receiving unit 24, and changes the state into the READY state in step S150 (FIG. 12).

In step S145, if it is determined that the STOP request has been made, the display-picture control unit 22 proceeds to step S151, and transmits the method TEARDOWN. In step S150, the display-picture control unit 22 changes the state into the INIT state (FIG. 12).

Figure 16:
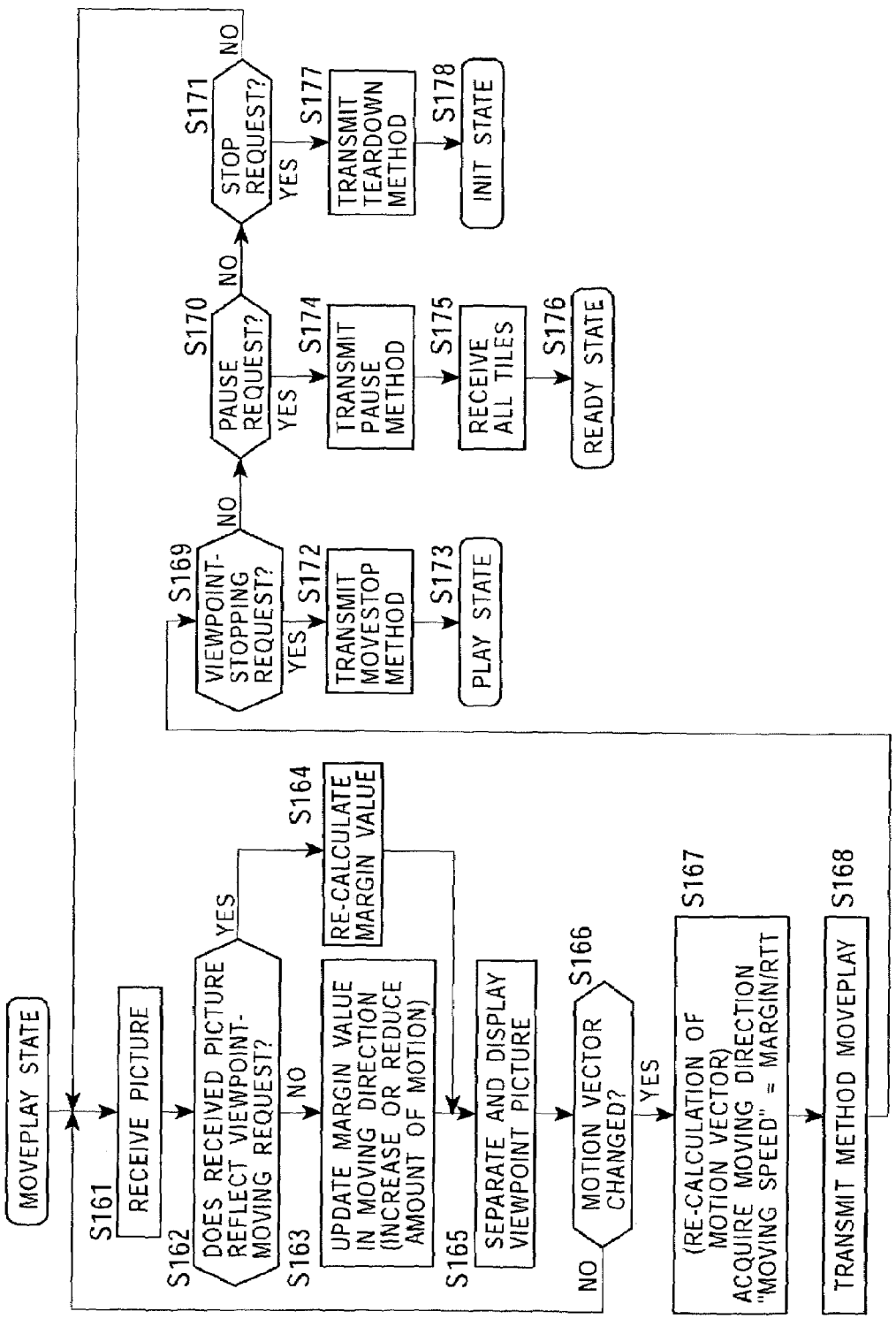
FIG. 16 is a flowchart illustrating a process performed in the MOVEPLAY state of the picture receiving apparatus 2.
Figure 17:
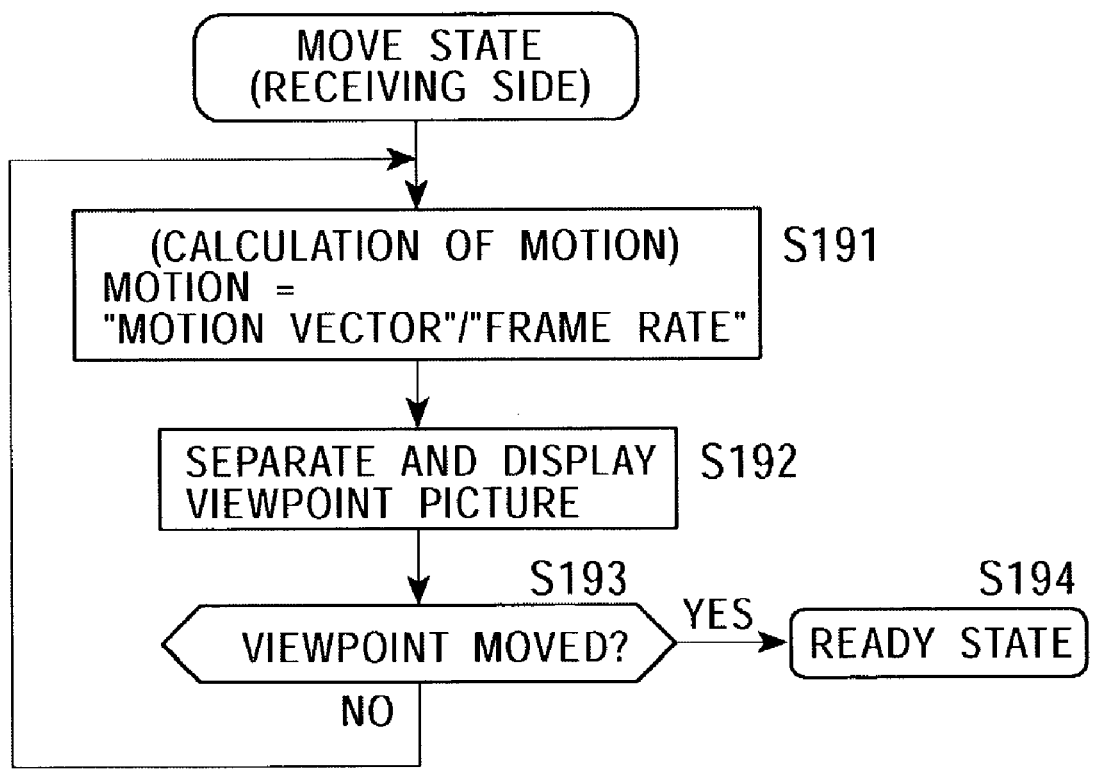
FIG. 17 is a flowchart illustrating a process performed in the MOVE state of the picture receiving apparatus 2.

In the MOVEPLAY state in FIG. 16, when the display-picture control unit 22 receives the picture in step S161, it determines, in step S162, whether, in the picture received in step S161, the viewpoint-moving request is reflected. If it is not reflected, the display-picture control unit 22 proceeds to step S163 and updates a margin value in the moving direction. In other words, this increases or reduces the margin in the moving direction by the motion.

In step S162, if it is determined that in the received picture the viewpoint-moving request is reflected, the display-picture control unit 22 proceeds to step S164 and executes re-calculation of the margin value. After steps S163 and S164, the display-picture control unit 22 proceeds to step S165. In step S165, the display-picture control unit 22 extracts a picture corresponding to the viewpoint input from the viewpoint-information input unit 21, and outputs and displays the extracted picture on the picture output unit 25.

Proceeding to step S166, the display-picture control unit 22 determines whether the motion vector has been changed. If it has not been changed, the display-picture control unit 22 returns to step S161 and continuously executes the subsequent steps.

In step S166, if it is determined that the motion vector has been changed, the display-picture control unit 22 proceeds to step S167, and executes re-calculation of the motion vector. In other words, the display-picture control unit 22 further acquires, from the viewpoint-information input unit 21, the moving direction, and calculates the moving speed based on the following expression:

$$\text{Moving Speed} = \text{Margin}/RTT$$

Next, proceeding to step S168, the display-picture control unit 22 transmits the method MOVEPLAY. In step S169, the display-picture control unit 22 determines whether the viewpoint stopping request has been made. If it has not been made, the display-picture control unit 22 proceeds to step S170 and determines whether the PAUSE request has been made. When even the PAUSE request has not been made, the display-picture control unit 22 proceeds to step S171 and determines whether the STOP request has been made. If it has not been made, the display-picture control unit 22 returns to step S161 and continuously executes the subsequent steps.

In step S169, if it is determined that the viewpoint stopping request has been made, the display-picture control unit 22 proceeds to step S172 and transmits the method MOVESTOP. In step S173, the display-picture control unit 22 changes the state into the PLAY state (FIG. 12).

In step S170, if it is determined that the PAUSE request has been made, the display-picture control unit 22 proceeds to step S174 and transmits the method PAUSE. In step S175, the display-picture control unit 22 executes reception of all the tiles through the stream receiving unit 24. In step S176, the display-picture control unit 22 changes the state into the READY state (FIG. 12).

In step S171, if it is determined that the STOP request has been made, the display-picture control unit 22 proceeds to step S177 and executes transmission of the method TEAR-DOWN. In step S178, the display-picture control unit 22 changes the state into the INIT state (FIG. 12).

In the process of the MOVE state, in step S191, the display-picture control unit 22 executes calculation of the motion based on the following expression:

Motion=Motion Vector/Frame Rate

Next, proceeding to step S192, the display-picture control unit 22 separates a picture corresponding to the viewpoint information from the viewpoint-information input unit 21, and outputs and displays the picture on the picture output unit 25. In step S193, the display-picture control unit 22 determines whether the viewpoint has been moved. If it has been moved, the display-picture control unit 22 returns to step S191 and continuously executes the subsequent steps (FIG. 12). In step S193, if it is determined that the viewpoint has not been move, the display-picture control unit 22 proceeds to step S194 and changes the state into the READY state.

An idea that only a portion being actually viewed is transmitted can be applied also to the case of constituting a car navigation system using the Internet. In this case, by storing map information of the entirety in the form of pictures of JPEG 2000, and performing division into tiles in units of, for example, degrees of latitude and longitude, a control method for the system can be handled similarly to distribution of partial omnidirectional pictures.

As described above, the picture receiving apparatus 2 calculates the margin of a portion which is actually output (displayed) by the picture receiving apparatus 2 and which corresponds to a portion of a picture transmitted from the picture transmitting apparatus 1 to the picture receiving apparatus 2. However, the calculation may be executed by the picture transmitting apparatus 1. In this case, based on the viewpoint information from the picture receiving apparatus 2, and the calculated margin, the picture transmitting apparatus 1 determines and extracts from the omnidirectional picture a portion to be transmitted to the picture receiving apparatus 2, and transmits the portion to the picture receiving apparatus 2.

At this time, the picture transmitting apparatus 1 can determine the size of the picture for transmission by measuring a response time with RTCP. Also, the picture receiving apparatus 2 can determine and notify the picture transmitting apparatus 1 of the size of the picture.

In addition, at this time, before initiating a session, in a set-up mode, or during a session, for example, by using RTSP, both the picture transmitting apparatus 1 and the picture receiving apparatus 2 must mutually obtain agreement about the moving speed of the viewpoint.

The above consecutive processing can be executed by hardware, but may be executed by software. When software is used to execute the consecutive processing, programs constituting the software are installed from a network or a recording medium into a computer built into dedicated hardware or into, for example, a multi-purpose personal computer in which by installing various programs, various functions can be executed.

The types of the recording medium, not only includes magnetic disks (including floppy disks), optical disks (including CD-ROMs and DVDs), magneto-optical disks (MiniDiscs), and package media including a semiconductor memory, but also include ROMs and hard disks containing programs.

In this Specification, steps constituting a program recorded on the recording medium include, not only processes which are time-sequentially performed in accordance with described order, but also processes which are executed in parallel or separately if they are not always performed time-sequential order. In this Specification the system represents the entirety of an apparatus including a plurality of units.

As described above, according to the present invention, a picture can be distributed from a transmitting apparatus to a receiving apparatus. Also, even if the viewpoint is moved, the receiving apparatus can output and display, in real time, a picture corresponding to the new viewpoint.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A picture distribution system comprising:
   a receiving apparatus; and
   a transmitting apparatus in communication with said receiving apparatus for distributing omnidirectional pictures to said receiving apparatus through a network;
   said transmitting apparatus including,
      first receiving means for receiving viewpoint information from said receiving apparatus;
      extracting means for, based on the received viewpoint information, extracting a predetermined area as a first picture from an omnidirectional picture to be sent to said receiving apparatus; and
      first transmitting means for transmitting, to said receiving apparatus, unit regions obtained by dividing the first picture; and
   said receiving apparatus including:
      acquiring means for acquiring the viewpoint information;
      second transmitting means for transmitting the acquired viewpoint information to said transmitting apparatus;
      second receiving means for receiving the first picture transmitted from said second transmitting apparatus;
      storage means for storing the first picture received by said second receiving means; and
      output means for outputting a second picture as a predetermined area extracted from the stored first picture, the second picture corresponding to the acquired viewpoint information,
   wherein, based on a motion vector included in the received viewpoint information and a transmission delay of said network, said extracting means determines the next predetermined area to be extracted from the omnidirectional picture.

2. A picture distribution method for distributing an omnidirectional picture from a transmitting apparatus to a receiving apparatus by a network, comprising the steps of:
   a first receiving step for receiving viewpoint information from said receiving apparatus;
   an extracting step for, based on the received viewpoint information, extracting a predetermined area as a first picture from an omnidirectional picture to be distributed to said receiving apparatus;

a first transmitting step for transmitting, to said receiving apparatus, unit regions obtained by dividing the first picture;

an acquiring step for acquiring the viewpoint information transmitted to said transmitting apparatus;

a second transmitting step for transmitting the acquired viewpoint information to said transmitting apparatus;

a second receiving step for receiving the first picture transmitted from said transmitting apparatus;

a storage step for storing the first picture received in said second receiving step;

an output step for outputting a second picture as a predetermined area extracted from the stored first picture, the second picture corresponding to the acquired viewpoint information; and a determining step for determining the next predetermined area to be extracted from the omnidirectional picture based on a motion vector included in the received viewpoint information and a transmission delay of said network.

3. A picture distribution apparatus for distributing omnidirectional pictures to a receiving apparatus through a network, comprising:

receiving means for receiving viewpoint information from said receiving apparatus;

extracting means for, based on the received viewpoint information, extracting a predetermined area as a picture from an omnidirectional picture to be distributed to the receiving apparatus;

transmitting means for transmitting, to said receiving apparatus, predetermined unit regions obtained by dividing the picture; and determining means for determining the next predetermined area to be extracted from the omnidirectional picture based on a motion vector included in the received viewpoint information and a transmission delay of said network.

4. A picture distribution apparatus according to claim 3, further comprising calculating means for calculating the margin of the predetermined area which is output by said receiving apparatus in response to the viewpoint information, and which corresponds to the predetermined area transmitted to said receiving apparatus by said transmitting means, wherein, based on the received viewpoint information and the calculated margin, said extracting means extracts the predetermined area as the picture from the omnidirectional picture.

5. A picture distribution method for a picture distribution apparatus for distributing an omnidirectional picture to a receiving apparatus by a network, comprising the steps of:

receiving viewpoint information from said receiving apparatus;

extracting, based on the received viewpoint information, a predetermined area as a picture from the omnidirectional picture to be distributed to the receiving apparatus;

transmitting, to said receiving apparatus, predetermined unit regions obtained by dividing the picture; and determining the next predetermined area to be extracted from the omnidirectional picture based on a motion vector included in the received viewpoint information and a transmission delay of said network.

6. A recording medium containing a computer-readable program for a picture distribution apparatus for distributing an omnidirectional picture to a receiving apparatus, the program causing the apparatus to execute comprising the steps of:

receiving viewpoint information from said receiving apparatus;

extracting, based on the received viewpoint information, a predetermined area as a picture from an omnidirectional picture to be distributed to the receiving apparatus;

transmitting, to said receiving apparatus, predetermined unit regions obtained by dividing the picture; and determining the next predetermined area to be extracted from the omnidirectional picture based on a motion vector included in the received viewpoint information and a transmission delay of a network.

7. A program stored in a computer readable medium for a computer controlling a picture distribution apparatus for distributing an omnidirectional picture by a network, said program causing the computer to execute the steps of:

receiving viewpoint information from said receiving apparatus;

extracting, based on the received viewpoint information, a predetermined area as a picture from the omnidirectional picture to be distributed;

transmitting, to said receiving apparatus, predetermined unit regions obtained by dividing the picture; and determining the next predetermined area to be extracted from the omnidirectional picture based on a motion vector included in the received viewpoint information and a transmission delay of said network.

8. A picture receiving apparatus for receiving an omnidirectional picture distributed from a transmitting apparatus through a network, said picture receiving apparatus comprising:

acquiring means for acquiring viewpoint information;

transmitting means for transmitting the acquired viewpoint information to said transmitting apparatus;

receiving means for receiving a first picture as a predetermined area extracted from the omnidirectional picture, the first picture being transmitted from said transmitting apparatus;

storage means for storing the received first picture;

output means for outputting a second picture as a predetermined area extracted from the stored first picture, the second picture corresponding to the acquired viewpoint information; and determining means for determining the next predetermined area to be extracted from the omnidirectional picture based on a motion vector included in the acquired viewpoint information and a transmission delay of said network.

9. A picture receiving apparatus according to claim 8, further comprising calculating means for calculating the margin of the second picture which corresponds to the first picture, wherein, based on the calculated margin, said transmitting means transmits the viewpoint information to said transmitting apparatus.

10. A picture receiving method for a picture receiving apparatus receiving an omnidirectional picture distributed from a transmitting apparatus through a network, said picture receiving method comprising the steps of:

acquiring viewpoint information;

transmitting the acquired viewpoint information to said transmitting apparatus;

receiving a first picture as a predetermined area extracted from the omnidirectional picture, the first picture being transmitted from said transmitting apparatus;

storing the received first picture;

outputting a second picture as a predetermined area extracted from the stored first picture, the second picture corresponding to the acquired viewpoint information; and determining the next predetermined area to be extracted from the omnidirectional picture based on a motion vector included in the acquired viewpoint information and a transmission delay of said network.

11. A recording medium containing a computer-readable program for a picture receiving apparatus for receiving an omnidirectional picture distributed from a transmitting apparatus by a network, the program causing the apparatus to execute comprising the steps of:

acquiring viewpoint information;

transmitting the acquired viewpoint information to said transmitting apparatus;

receiving a first picture as a predetermined area extracted from the omnidirectional picture, the first picture being transmitted from said transmitting apparatus;

storing the received first picture; and outputting a second picture as a predetermined area extracted from the stored first picture, the second picture corresponding to the acquired viewpoint information;

determining the next predetermined area to be extracted from the omnidirectional picture based on a motion vector included in the acquired viewpoint information and a transmission delay of said network.

12. A program stored in a computer readable medium for a computer controlling a picture receiving apparatus for receiving an omnidirectional picture distributed from a transmitting apparatus by a network, said program causing the computer to execute the steps of:

acquiring viewpoint information;

transmitting the acquired viewpoint information to said transmitting apparatus;

receiving a first picture as a predetermined area extracted from the omnidirectional picture, the first picture being transmitted from said transmitting apparatus;

storing the received first picture;

outputting a second picture as a predetermined area extracted from the stored first picture, the second picture corresponding to the acquired viewpoint information; and determining the next predetermined area to be extracted from the omnidirectional picture based on a motion vector included in the acquired viewpoint information and a transmission delay of said network.

* * * * *